(12) United States Patent
Nonobe et al.

(10) Patent No.: US 8,197,986 B2
(45) Date of Patent: Jun. 12, 2012

(54) FUEL CELL DEVICE

(75) Inventors: Toshihiko Nonobe, Tokyo (JP); Noriyuki Takada, Tokyo (JP)

(73) Assignee: KabushikiKaisha Equos Research (JP)

( * ) Notice: Subject to any disclaimer, the term of this patent is extended or adjusted under 35 U.S.C. 154(b) by 737 days.

(21) Appl. No.: 12/224,425

(22) PCT Filed: Feb. 28, 2007

(86) PCT No.: PCT/JP2007/053718
§ 371 (c)(1), (2), (4) Date: Feb. 9, 2009

(87) PCT Pub. No.: WO2007/099982
PCT Pub. Date: Sep. 7, 2007

(65) Prior Publication Data
US 2009/0305108 A1    Dec. 10, 2009

(30) Foreign Application Priority Data
Mar. 1, 2006   (JP) .................................. 2006-054755

(51) Int. Cl.
H01M 8/02 (2006.01)
(52) U.S. Cl. ........................................ 429/512; 429/514
(58) Field of Classification Search ................. 429/452, 429/467–470, 512–514, 517–519
See application file for complete search history.

(56) References Cited

U.S. PATENT DOCUMENTS

| | | | | |
|---|---|---|---|---|
| 6,117,579 A * | 9/2000 | Gyoten et al. | ................ | 429/454 |
| 2002/0009630 A1 * | 1/2002 | Gao et al. | ................ | 429/34 |
| 2002/0018923 A1 * | 2/2002 | Kawahara | ................ | 429/26 |
| 2005/0019639 A1 * | 1/2005 | Nakakubo et al. | ................ | 429/34 |
| 2005/0287413 A1 * | 12/2005 | Suh et al. | ................ | 429/34 |
| 2006/0105227 A1 * | 5/2006 | Kim et al. | ................ | 429/44 |
| 2006/0286426 A1 * | 12/2006 | Kikuchi et al. | ................ | 429/34 |
| 2009/0325020 A1 * | 12/2009 | Numata | ................ | 429/30 |

FOREIGN PATENT DOCUMENTS

| | | | |
|---|---|---|---|
| JP | 05174849 A | * | 7/1993 |
| JP | 2003-282087 | | 10/2003 |
| JP | 2004-185944 | | 7/2004 |
| JP | 2005-197162 | | 7/2005 |
| JP | 2005-209470 | | 8/2005 |
| JP | 2005294117 A | * | 10/2005 |
| JP | 2006-012518 | | 1/2006 |

OTHER PUBLICATIONS

Machine Translation JP 5-174849 (Jul. 1993).*
Machine Translation JP 2005-294117 (Oct. 2005).*

* cited by examiner

*Primary Examiner* — Basia Ridley
*Assistant Examiner* — Jacob Buchanan
(74) *Attorney, Agent, or Firm* — Bacon and Thomas, PLLC

(57) ABSTRACT

A surface on the fuel electrode side of a lower portion of a separator in a fuel cell stack is made to have water repellency, so that water accumulated in a fuel gas flow path can be appropriately discharged, and thus so that reduction in fuel cell performance and deterioration of the fuel electrode can be surely prevented. For that purpose, in a fuel cell device, a fuel cell having an electrolyte layer interposed between the fuel electrode and an oxygen electrode includes a cell module laminated so as to interpose a separator formed with the fuel gas flow path along the fuel electrode, and a fuel gas flows substantially perpendicularly to the direction of gravity in the fuel gas flow path. The separator is provided with a water-repellent surface on the fuel electrode side of a lower portion thereof.

2 Claims, 7 Drawing Sheets

22 SEPARATOR — 35

G 27c
27
25
27a HOLLOW PORTION
27b WATER-REPELLENT SURFACE
34
33 FUEL ELECTRODE
32 AIR ELECTRODE
31 SOLID POLYMER ELECTROLYTE MEMBRANE
35

FUEL CELL DEVICE

TECHNICAL FIELD

The present invention relates to a fuel cell device.

BACKGROUND ART

Heretofore, because of having a high power generation efficiency and emitting no hazardous substances, a fuel cell has been put to practical use as a power generating device for industrial and household use, or as a source of power for an artificial satellite or a spacecraft, and in recent years, the development of fuel cells is being pursued as a source of power for a vehicle such as a passenger vehicle, a bus, a truck, a riding cart, or a luggage cart. Besides, although the fuel cell may be embodied as an alkaline fuel cell (AFC), a phosphoric acid fuel cell (PAFC), a molten carbonate fuel cell (MCFC), a solid oxide fuel cell (SOFC), or a direct methanol fuel cell (DMFC), the commonly used fuel cell is a polymer electrolyte membrane fuel cell (PEMFC).

In this case, a solid polymer electrolyte membrane is interposed between two gas diffusion electrodes to be bonded to form a single unit. Then, when hydrogen gas serving as a fuel is supplied onto the surface of one of the gas diffusion electrodes serving as a fuel electrode (anode), the hydrogen is dissociated into hydrogen ions (protons) and electrons, and the hydrogen ions permeate through the solid polymer electrolyte membrane. In addition, when air serving as an oxidizing agent is supplied onto the surface of the other of the gas diffusion electrodes serving as an oxygen electrode (cathode), oxygen in the air is combined with the hydrogen ions and electrons to form water. Thus, an electromotive force is generated by such an electrochemical reaction.

Besides, because both sides of the solid polymer electrolyte membrane need to be maintained in wet condition in the case of the polymer electrolyte membrane fuel cell, water is supplied onto each of the fuel electrode side and the oxygen electrode side. In this case, the water moves as proton-carrying water from the fuel electrode side to the oxygen electrode side, and moves as back-diffusing water from the oxygen electrode side to the fuel electrode side.

It is known that when the amount of the back-diffusing water is increased, a flow path for the hydrogen gas is locally blocked by water on the fuel electrode side, resulting in a reduction in fuel cell performance or degradation of the fuel electrode. As a result, technologies have been proposed in which a conductive material formed with a mesh is arranged in the hydrogen gas flow path between a separator and the fuel electrode so that the water is appropriately diffused (refer, for example, to Patent Document 1).
[Patent Document 1]
Japanese Patent Application Publication No. JP-A-2005-209470

DISCLOSURE OF THE INVENTION

Problem to be Solved by the Invention

However, because the related art fuel cell device does not have means to drain the water accumulated in the hydrogen gas flow path, there have been cases in which a part of the fuel electrode is covered by the water when the amount of the water accumulated in the hydrogen gas flow path increases, resulting in the occurrence of an abnormal reaction to deteriorate the fuel electrode.

In order to solve the problem of the related art fuel cell device, it is an object of the present invention to provide a fuel cell device that has a surface with water repellency on the fuel electrode side of a lower portion of a separator in a fuel cell stack, so that the water accumulated in a fuel gas flow path can be appropriately discharged, and thus so that the reduction in fuel cell performance and the deterioration of the fuel electrode can be surely prevented.

Means for Solving the Problem

For that purpose, in a fuel cell device of the present invention, a fuel cell having an electrolyte layer interposed between a fuel electrode and an oxygen electrode includes a cell module laminated so as to interpose a separator formed with a fuel gas flow path along the fuel electrode, and a fuel gas flows substantially perpendicularly to the direction of gravity in the fuel gas flow path. The separator is provided with a water-repellent surface on the fuel electrode side of a lower portion thereof.

In addition, in another fuel cell device of the present invention, the separator is provided with hollow portions in which the fuel gas flows, and inner surfaces of at least some of the hollow portions are water-repellent surfaces.

Furthermore, in still another fuel cell device of the present invention, the separator is provided with the water-repellent surface in a portion corresponding to a water-accumulating portion in which water accumulates in the fuel gas flow path.

Effects of the Invention

According to the present invention, in a fuel cell device, a fuel cell having an electrolyte layer interposed between a fuel electrode and an oxygen electrode includes a cell module laminated so as to interpose a separator formed with a fuel gas flow path along the fuel electrode, and a fuel gas flows substantially perpendicularly to the direction of gravity in the fuel gas flow path. The separator is provided with a water-repellent surface on the fuel electrode side of a lower portion thereof.

In this case, because the water accumulated in the fuel gas flow path is smoothly discharged from the fuel gas flow path through the portion in which the water-repellent surface is formed, no abnormal reaction occurs at the fuel electrode, and thus deterioration of the fuel electrode and reduction in fuel cell performance can be surely prevented.

In addition, in another fuel cell device, the separator is provided with hollow portions in which the fuel gas flows, and inner surfaces of at least some of the hollow portions are water-repellent surfaces.

In this case, because the water that has flowed into the hollow portions can smoothly move in the hollow portions, excess water is smoothly discharged from the fuel gas flow path through the inside of the hollow portions, even when the amount of water in the fuel gas flow path has increased.

Furthermore, in still another fuel cell device, the separator is provided with the water-repellent surface in a portion corresponding to a water-accumulating portion in which water accumulates in the fuel gas flow path.

In this case, because the water accumulated in the water-accumulating portion is smoothly discharged, no abnormal reaction occurs in the portion of the fuel electrode that corresponds to the water-accumulating portion.

DESCRIPTION OF THE REFERENCE NUMERALS

11 FUEL CELL STACK
21 CELL MODULE
22 SEPARATOR
26 WATER-ACCUMULATING PORTION
27a HOLLOW PORTION
27b WATER-REPELLENT SURFACE
31 SOLID POLYMER ELECTROLYTE MEMBRANE
32 AIR ELECTRODE
33 FUEL ELECTRODE

BEST MODES FOR CARRYING OUT THE INVENTION

An embodiment according to the present invention will be described in detail below with reference to the accompanying drawings.

Figures 2A, 2B:
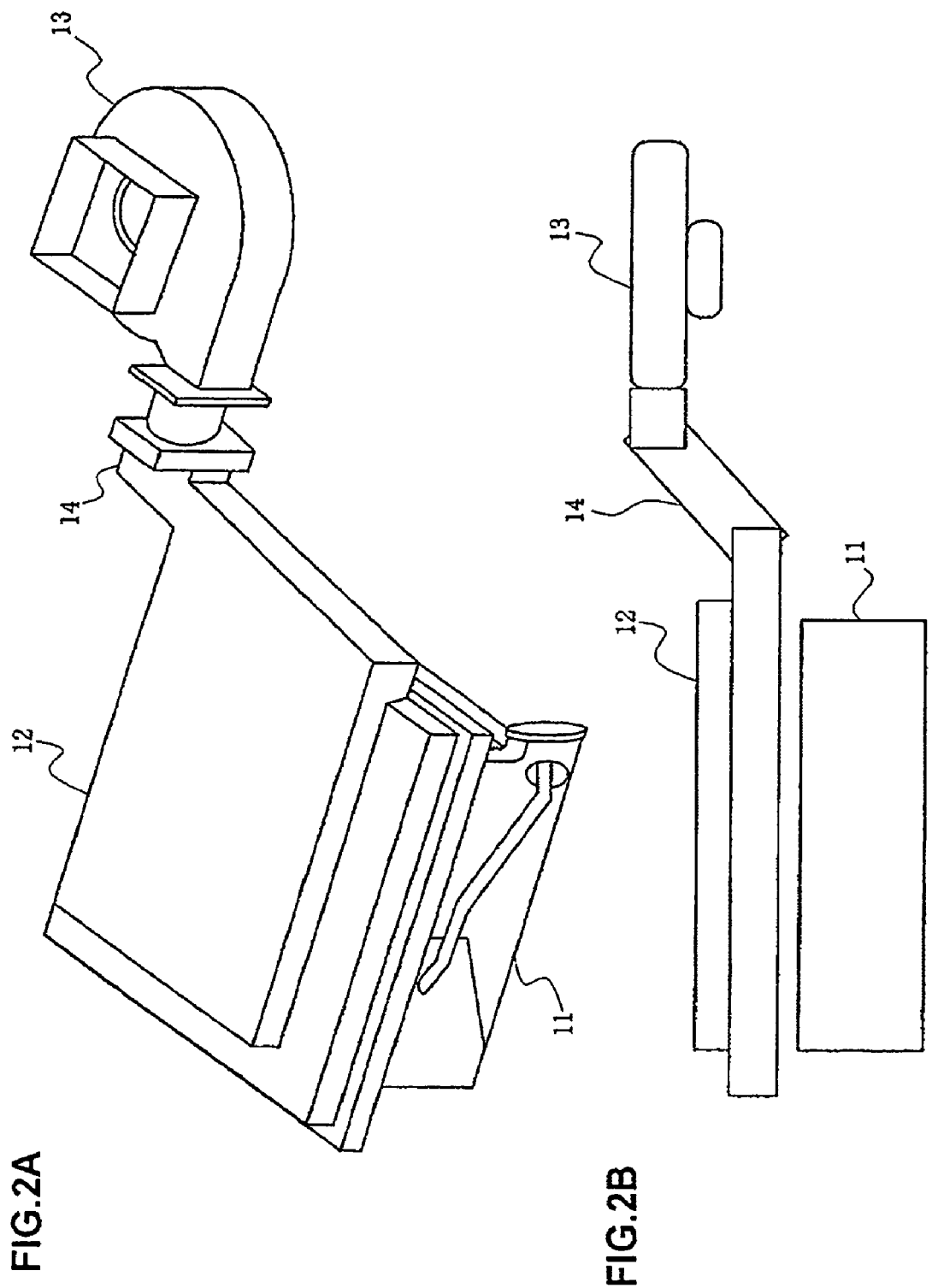
FIG. 2 shows views illustrating a fuel cell stack and an air supply fan of a fuel cell device mounted on a vehicle according to the embodiment of the present invention.

FIG. 2 shows views illustrating a fuel cell stack and an air supply fan of a fuel cell device mounted on a vehicle according to the embodiment of the present invention. Note that FIG. 2A is a perspective view, and FIG. 2B is a schematic perspective view.

In the drawings, reference numeral 11 denotes a fuel cell stack serving as a fuel cell (FC) device, which is used as a source of power for a vehicle such as a passenger vehicle, a bus, a truck, a riding cart, or a luggage cart. Here, because the vehicle is provided with a number of accessories, such as lighting devices, a radio, and power windows, that consume electricity used even while the vehicle is stopped, and also because the vehicle has a wide variety of driving patterns to require an extremely wide output range of the power source, it is desirable to use the fuel cell stack 11 serving as a power source together with a secondary battery or a capacitor serving as electrical storage means, which is not shown.

In addition, although the fuel cell stack 11 may be of an alkaline type, a phosphoric acid type, a molten carbonate type, a solid oxide type, a direct methanol type, or the like, it is preferable to be a polymer electrolyte membrane fuel cell.

Note that the fuel cell stack 11 is even more preferable to be a so-called proton exchange membrane fuel cell (PEMFC) or a proton exchange membrane (PEM) type fuel cell, in which hydrogen gas serves as a fuel gas, that is, an anode gas, and oxygen or air serves as an oxidizing agent, that is, a cathode gas. Here, the PEM type fuel cell is generally composed of a stack in which a plurality of cells are connected in series, where each cell combines a separator with a catalyst and electrodes on both sides of an electrolyte layer through which ions, such as protons, permeate.

In this embodiment, the fuel cell stack 11 has a plurality of cell modules 21, is which will be described later. The cell module 21 is structured by stacking, in the direction of sheet thickness, a plurality of sets, each of which includes a later-described unit cell (membrane electrode assembly, or MEA) 35 serving as a fuel cell and a later-described separator 22 which electrically connects the unit cells 35 with each other and separates between a flow path for the hydrogen gas serving as an anode gas and a flow path for air serving as a cathode gas, both gases being introduced into the unit cell 35. Note that in the cell module 21, the unit cells 35 and the separators 22 are stacked in a plurality of layers, so that the unit cells 35 are disposed at predetermined intervals. In this case, the cell modules 21 are connected with each other so as to conduct electricity and so that the fuel gas flow path, that is the hydrogen gas flow path, is continuously formed.

Moreover, as described later, the unit cell 35 is composed of a solid polymer electrolyte membrane 31 serving as an electrolyte layer, an air electrode 32 serving as an oxygen electrode provided on one side of the solid polymer electrolyte membrane 31, and a fuel electrode 33 provided on the other side. The air electrode 32 and the fuel electrode 33 are composed of an electrode diffusion layer made of an electrically conductive material that passes and diffuses a reaction gas, and a catalyst layer formed on the electrode diffusion layer and supported by the contact with the solid polymer electrolyte membrane 31.

Water moves in the unit cell 35. In this case, when hydrogen gas is supplied as the fuel gas, that is, the anode gas, in a fuel chamber formed on the fuel electrode 33 side of the separator 22, the hydrogen is dissociated into hydrogen ions and electrons, and the hydrogen ions pass through the solid polymer electrolyte membrane 31 accompanied by proton-carrying water. In addition, using the air electrode 32 as a cathode, when air is supplied as the oxidizing agent, that is, the cathode gas, in an oxygen chamber serving as an air flow path formed on the air electrode 32 side of the separator 22, the oxygen in the air is combined with the hydrogen ions and the electrons to form water. Note that the water passes through the solid polymer electrolyte membrane 31 as back-diffusing water and moves into the fuel chamber. Here, the back-diffusing water is the water that is formed in the oxygen chamber serving as an air flow path, diffuses in the solid polymer electrolyte membrane 31, and passes through the solid polymer electrolyte membrane 31 in the opposite direction to that of the hydrogen ions to penetrate to reach the fuel chamber.

The figure shows a device that supplies the air serving as an oxidizing agent to the fuel cell stack 11. In this case, the air is pulled by an air supply fan 13 serving as an oxidizing agent supply source through an unshown air filter, and supplied from the air supply fan 13 through an air supply line 14 and an air intake manifold 12 to the oxygen chamber of the fuel cell stack 11, that is, the air flow path. In this case, the pressure of the supplied air is a normal pressure in the vicinity of atmospheric pressure. Note that any kind of fan can be used as the air supply fan 13 if it can pull and discharge air. In addition, any kind of filter can be used as the air filter if it can remove dust, impurities, and the like contained in the air. Note that oxygen can be used in place of air, as the oxidizing agent. Then, the air exhausted from the air flow path is discharged into atmosphere through an exhaust manifold, which is not shown. In the example shown in the figure, the air flows in the fuel cell stack 11 from top to bottom of FIG. 2B.

In addition, in the air supply line 14, there can be arranged a water supply nozzle for supplying water by spraying it into the air that is supplied to the air flow path to maintain the air electrode serving as an oxygen electrode of the fuel cell stack 11 in a wet condition. Moreover, at the end of the exhaust manifold, a condenser can be arranged for condensing and removing the moisture in the air that is discharged from the fuel cell stack 11. In this case, it is desirable that the water condensed by the condenser is collected in a water tank, which is not shown. Then, by supplying the water in the tank to the water supply nozzle, the water can be recycled to be reused without being wasted.

On the other hand, the hydrogen gas serving as a fuel gas is supplied from unshown fuel storage means composed of a container containing a hydrogen storage alloy, a container containing a hydrogen storing liquid such as decalin, a hydrogen gas cylinder, or the like, through a fuel supply line, to an inlet of the fuel gas flow path of the fuel cell stack 11. Then, the hydrogen gas exhausted as an unreacted component from an outlet of the fuel gas flow path of the fuel cell stack 11 is discharged to the outside of the fuel cell stack 11 through a fuel discharge line, which is not shown. Note that it is desirable that a water collection drain tank is arranged in the fuel discharge line to collect the water separated from the exhausted hydrogen gas. This allows the hydrogen gas, which is discharged from the water collection drain tank after separating the water, to be collected and supplied to the fuel gas flow path of the fuel cell stack 11 to be reused.

Next, a structure of the fuel cell stack 11 will be described in detail below.

Figure 3:
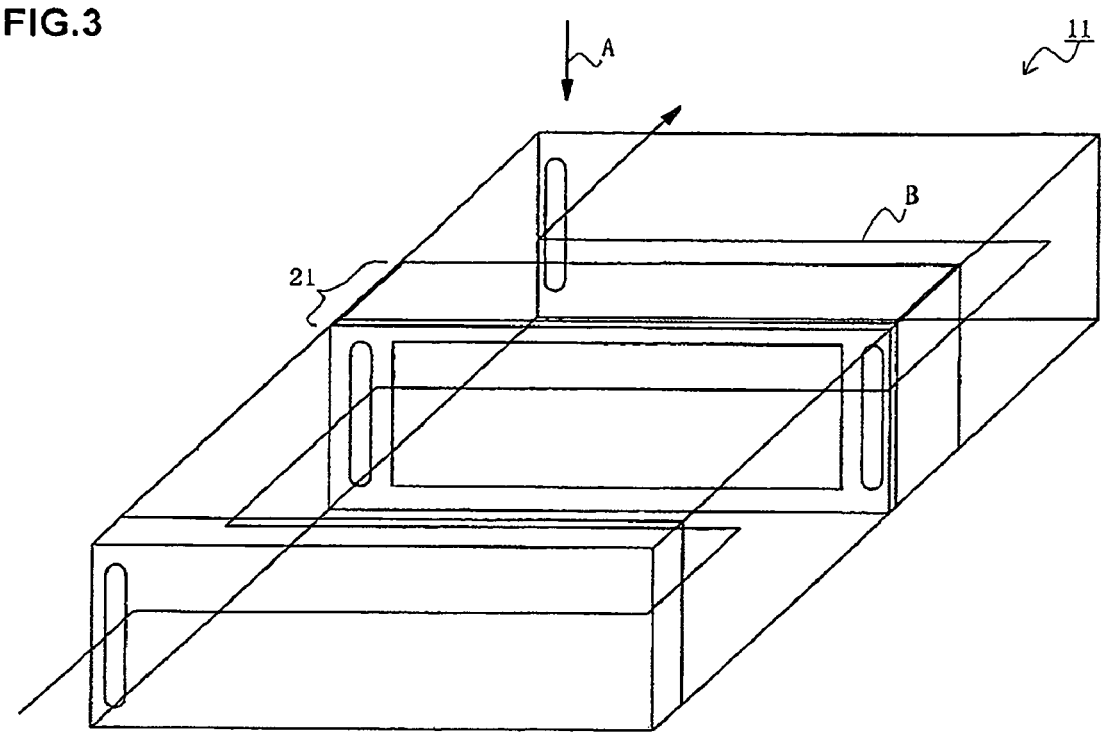
FIG. 3 is a schematic perspective view showing a structure of the fuel cell stack according to the embodiment of the present invention.
Figure 4:
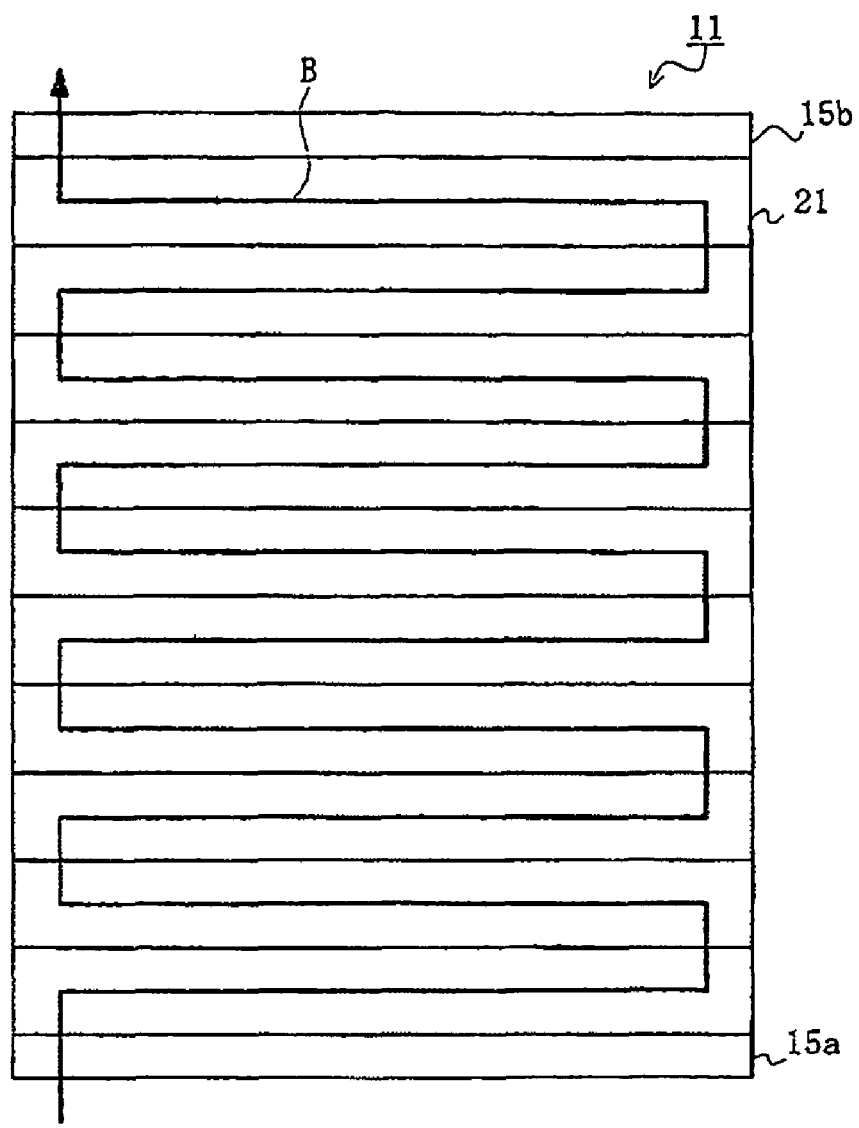
FIG. 4 is a schematic top view showing the structure of the fuel cell stack according to the embodiment of the present invention.
Figure 5A:
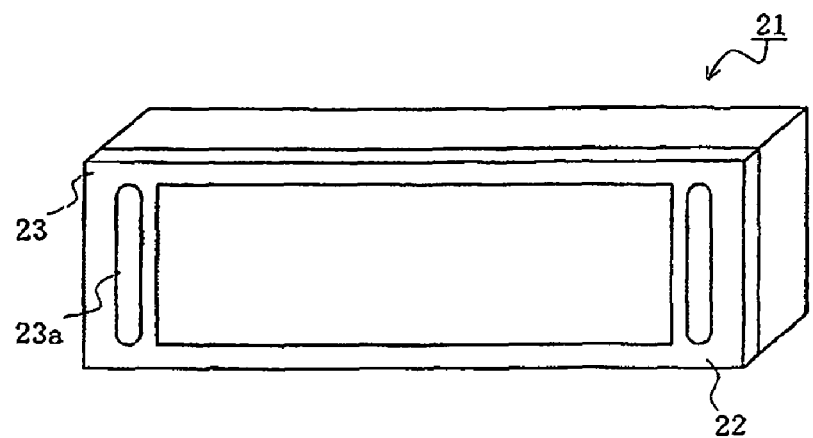
FIG. 5 shows schematic perspective views illustrating structures of cell modules according to the embodiment of the present invention.
Figure 5B:
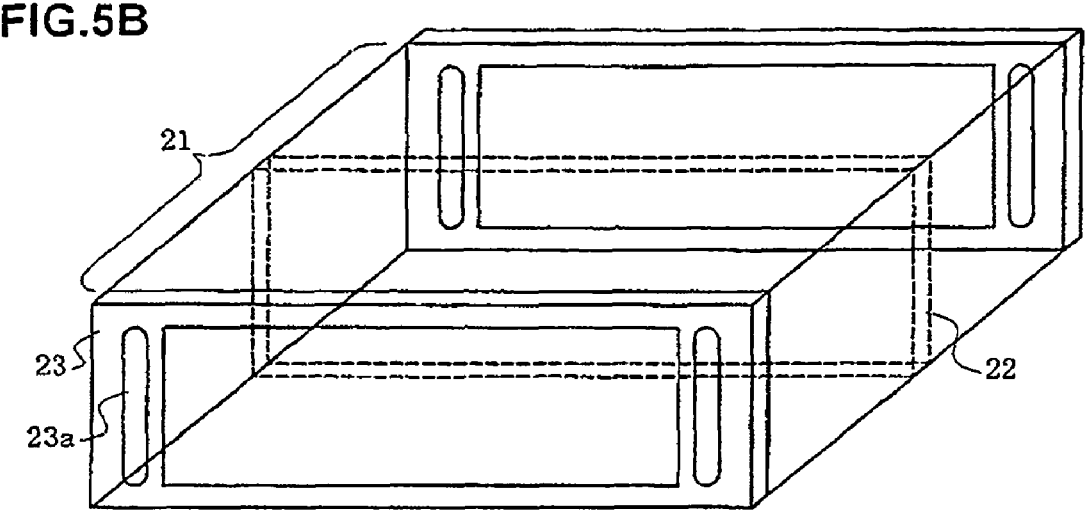
Figure 6A:
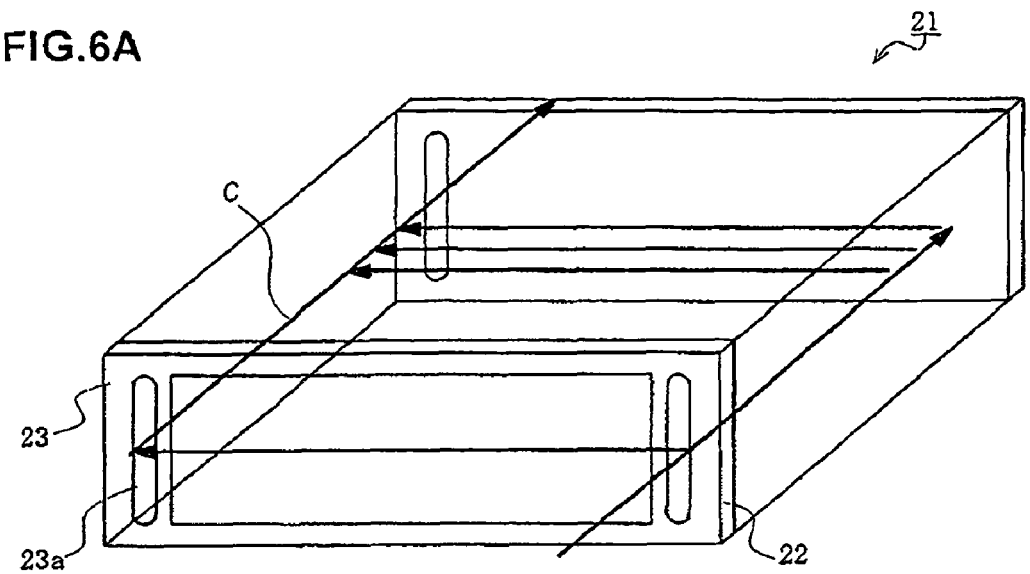
FIG. 6 shows schematic perspective views illustrating flows of hydrogen gas in the cell modules according to the embodiment of the present invention.
Figure 6B:
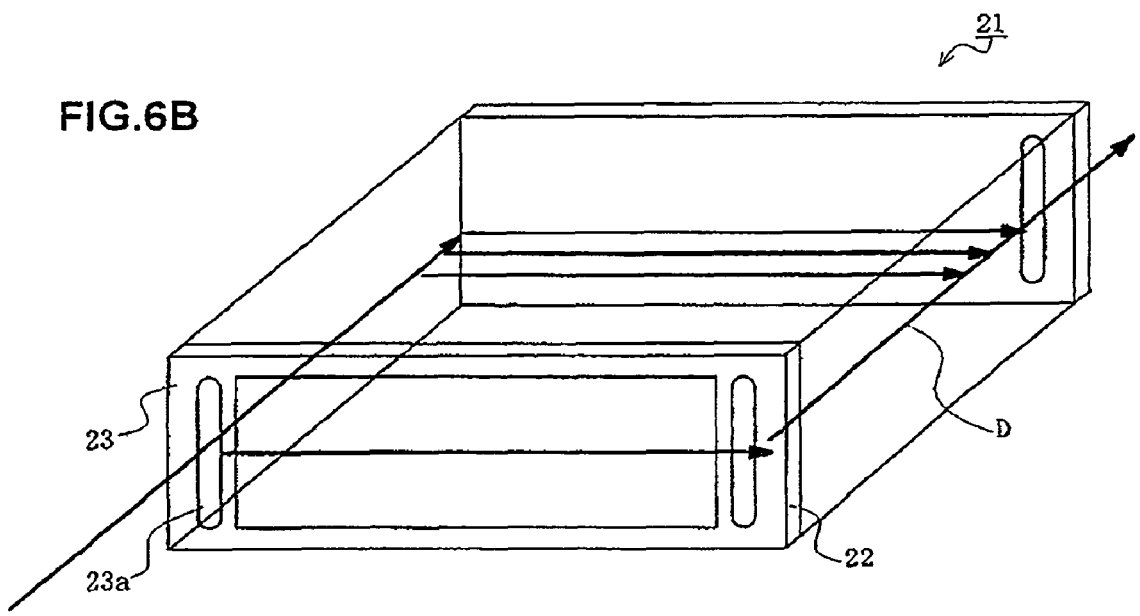

FIG. 3 is a schematic perspective view showing a structure of the fuel cell stack according to the embodiment of the present invention; FIG. 4 is a schematic top view showing the structure of the fuel cell stack according to the embodiment of the present invention; FIG. 5 shows schematic perspective views illustrating structures of cell modules according to the embodiment of the present invention; and FIG. 6 shows schematic perspective views illustrating flows of hydrogen gas in the cell modules according to the embodiment of the present invention. Note that FIG. 5A is a diagram showing an ordinary cell module; FIG. 5B is a diagram showing a cell module with a separate separator; FIG. 6A is a diagram showing the flow of hydrogen gas in the cell module in the order of an odd number; and FIG. 6B is a diagram showing the flow of hydrogen gas in the cell module in the order of an even number.

Here, explanation is made using an example in which one piece of the cell module 21 is formed by stacking ten sets of the unit cell 35 and the separator 22 in layers and also stacking one more sheet of the separator 22 so that the separators 22 are always arranged on both sides of the unit cell, and ten pieces of the cell module 21 are stacked in layers to form one unit of the fuel cell stack 11.

In this case, the fuel cell stack 11 has a flattened rectangular parallelepiped shape as a whole, and the flow of the air inside is in the direction of gravity, that is, straight from top to bottom, as shown by arrow A in FIG. 3. In addition, as shown by arrows B in FIGS. 3 and 4, the flow of the hydrogen gas is in the direction of gravity, that is, in a serpentine or meandering shape turning around at the end of each cell module 21 in the horizontal plane substantially perpendicular to the arrow A. Note that in FIG. 4, reference numeral 15a denotes an end plate arranged on the inlet side of the hydrogen gas (lower side of FIG. 4), whereas reference numeral 15b denotes an end plate arranged on the outlet side (upper side of FIG. 4). The end plate 15a and the end plate 15b are connected with each other with a force to tighten the cell modules 21 applied by a tightening shaft, which is not shown.

In addition, each cell module 21 has a rectangular parallelepiped shape as a whole, as shown in FIG. 5A, and includes eleven sheets of the separator 22, as described above. Note that the separator 22 has a box-shaped frame portion 23 enclosing the circumference of a rectangular opening and long holes 23a formed in the vicinity of both longitudinal ends. As shown in FIG. 5A, the separators 22 closely contact each other and are stacked in layers so that the long holes 23a are arranged in line with each other, thus allowing the long holes 23a to form the hydrogen gas flow path penetrating in the direction of stacking of the separators 22. Note that FIG. 5B shows the cell module 21 in the state in which the separators 22 are spaced with each other, that is in the disassembled state, for explanatory purposes.

Here, the flow of the hydrogen gas in the cell module 21 in the order of an odd number counted from the top in FIG. 4 is as shown by arrow C in FIG. 6A. In this case, it is understood that the hydrogen gas flows through two paths that are formed by the long holes 23a arranged in lines on the right and left sides, and through ten hydrogen gas flow paths that are formed so as to connect the right and left long holes 23a on the fuel electrode 33 sides of the separators 22. In addition, the flow of the hydrogen gas in the cell module 21 in the order of an even number counted from the top in FIG. 4 is as shown by arrow D in FIG. 6B. In this case, it is understood that, in the same way as the flow in the cell module 21 in the order of an odd number, the hydrogen gas flows through two paths that are formed by the long holes 23a arranged in lines on the right and left sides, and through ten hydrogen gas flow paths that are formed so as to connect the right and left long holes 23a on the fuel electrode 33 sides of the separators 22.

Next, the hydrogen gas flow path on the fuel electrode 33 side of the separator 22 will be described below.

Figure 7:
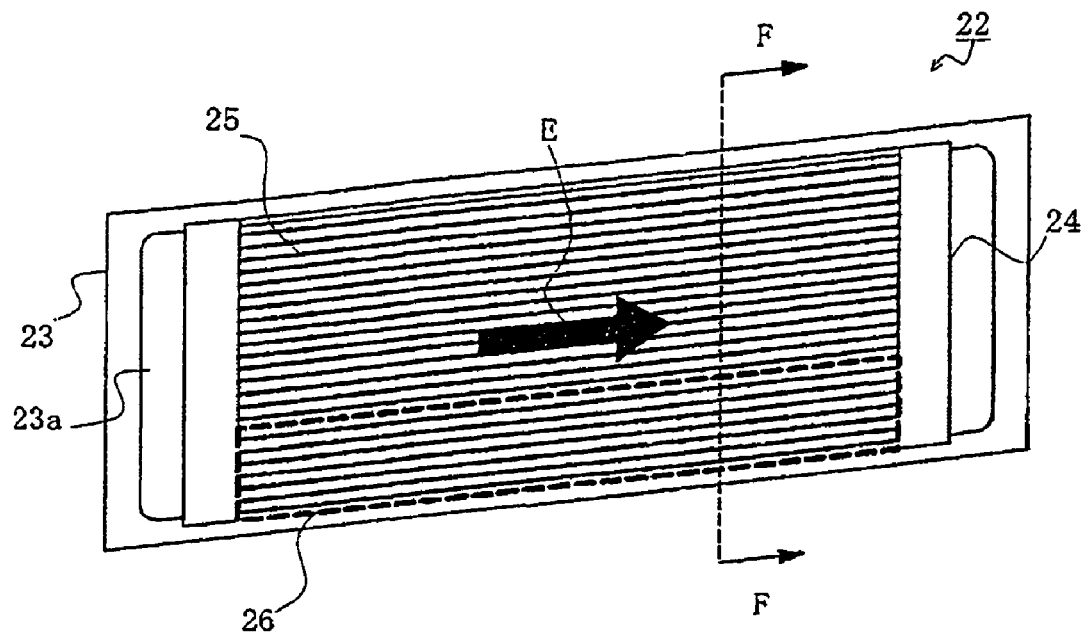
FIG. 7 is a diagram showing a hydrogen gas flow path on the fuel electrode side of a separator according to the embodiment of the present invention.

FIG. 7 is a diagram showing the hydrogen gas flow path on the fuel electrode side of the separator according to the embodiment of the present invention.

As shown in the figure, the separator 22 has a main body 25 of rectangular plate shape that is arranged in the opening of the frame portion 23 and supported by the frame portion 23, and a plate-shaped outer circumferential reinforcing plate 24 that is provided with a rectangular opening and attached to adhere to the circumference of the main body 25. Here, the hydrogen gas flows substantially perpendicularly to the direction of gravity as shown by arrow E. Moreover, the main body 25 has a function as a collector, as well as a function to shut off the hydrogen gas supplied to the fuel electrode 33 and the air supplied to the oxygen electrode 32 by separating the hydrogen gas flow path from the air flow path, and is a plate-shaped member made of a material with a low electric resistance, such as carbon or metal. Note that the circumferential reinforcing plate 24 functions also as a seal member for preventing the hydrogen gas from leaking, and can be omitted if any other member can prevent the leak of the hydrogen gas.

Then, the water that has penetrated as the back-diffusing water to reach the fuel chamber moves downward in the hydrogen gas flow path by its own weight, that is, by the action of gravity. Therefore, if the amount of the back-diffusing water increases, resulting in an increase of water in the hydrogen gas flow path, surplus water accumulates in the lower part in the hydrogen gas flow path to generate a water-accumulating portion 26. The water-accumulating portion 26 is a strip-shaped area extending in the direction parallel to that of the hydrogen gas flow.

Normally, in the water-accumulating portion 26, because the fuel electrode 33 is covered locally, or even entirely, by water, the fuel electrode 33 is made to have a smaller area for contacting the hydrogen gas to generate an electrochemical reaction. In addition, because the hydrogen gas remains in the hydrogen gas flow path more easily due to prevention of the hydrogen gas flow by the water, the remaining hydrogen mixes with the air at start or stop of the fuel cell stack 11, generating an abnormal reaction such as a potential shift, resulting in degradation of the fuel electrode 33.

Therefore, in the present embodiment, resistance of water flow is reduced by applying water-repellent treatment to the surface at the lower portion of the separator 22, so that the water accumulated in the water-accumulating portion 26 smoothly flows in the lateral direction and is discharged to the fuel cell stack 11. Because, by this means, the excess water is smoothly discharged from the hydrogen gas flow path even when the amount of the water in the hydrogen gas flow path has been increased by the increase of the amount of the back-diffusing water, the fuel electrode 33 is not covered by the water either locally or entirely. Therefore, because the reduction in the area required for the electrochemical reaction, which is generated by contact of the hydrogen gas with the fuel electrode 33, is prevented, reduction in performance of the fuel cell and deterioration of the fuel electrode 33 can be prevented. In addition, because the flow of the hydrogen gas becomes smooth and thus the hydrogen gas is not retained in the hydrogen gas flow path, there is no occurrence of the potential shift which is caused by mixture of the remaining hydrogen gas and the air at start or stop of the fuel cell stack 11, and therefore the fuel electrode 33 does not deteriorate.

Next, a structure of the tower portion of the separator 22 will be described in detail below.

Figure 1A:
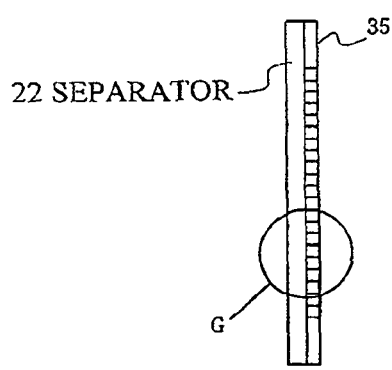
FIG. 1 shows sectional views illustrating a separator according to an embodiment of the present invention.
Figure 1B:
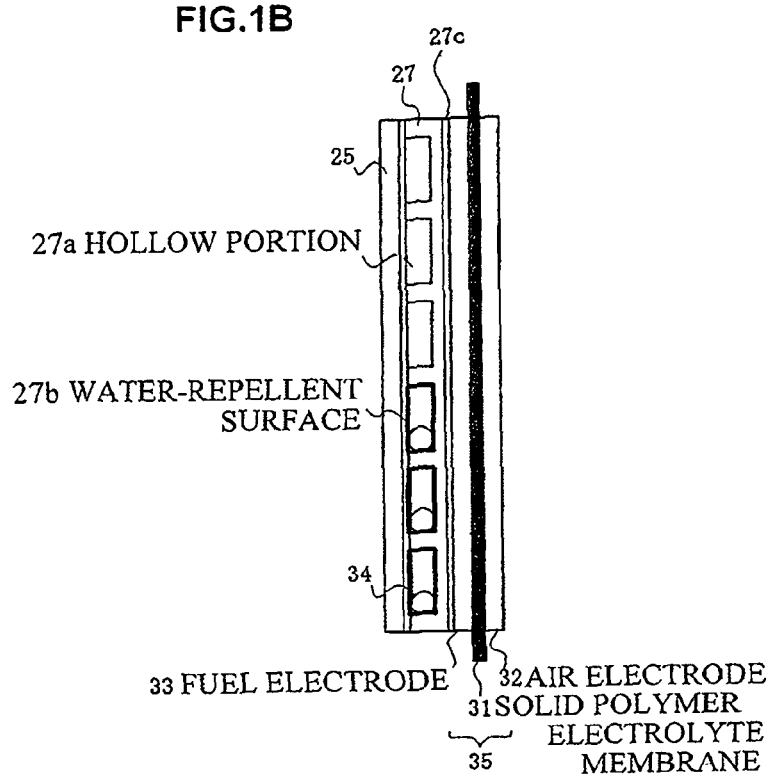

FIG. 1 shows cross-sectional views illustrating the separator according to the embodiment of the present invention. Note that FIG. 1A is a cross-sectional view taken along arrow line F-F in FIG. 7, and FIG. 1B is an enlarged view of portion G in FIG. 1A.

FIG. 1A shows the state in which the separator 22 is stacked on the side of the fuel electrode 33 of the unit cell 35. The unit cell 35 is composed of the solid polymer electrolyte membrane 31, and also of a pair of the air electrode 32 and the fuel electrode 33 that are provided on both sides of the solid polymer electrolyte membrane 31, as shown in FIG. 1B. Here, the solid polymer electrolyte membrane 31 is made of, for example, perfluorinated sulfonic acid polymer, which is sold under the trade name of NAFION®; however, it may be made of any material. In addition, both of the air electrode 32 and the fuel electrode 33 are composed of a catalyst layer and an electrode diffusion layer. The catalyst layer is made of, for example, a catalyst in which fine particles such as platinum or ruthenium particles serving as a catalytic substance are supported on the surface of carbon particles; however, it may be made of any material. Furthermore, the electrode diffusion layer uses, for example, cloth or paper as a base material; however, it may be made of any material. Then, the solid polymer electrolyte membrane 31, the air electrode 32, and the fuel electrode 33 are stacked in layers, and made closely contact each other to form a unit, so that the unit cell 35 is obtained.

In addition, the separator 22 includes, on one side thereof, a fuel electrode side collector 27 serving as a collector, as shown in FIG. 1B. The fuel electrode side collector 27 is a member for conducting electric current outward by contacting the electrode diffusion layer of the fuel electrode 33 and also for supplying the fuel gas to the fuel electrode, and is formed with a porous body made of an electrically conductive material of a low electrical resistance, such as carbon or metal. In addition, because the fuel electrode side collector 27 is located in the hydrogen gas flow path, a plurality of hollow portions 27a through which hydrogen gas passes are formed between the fuel electrode side collector 27 and the separator 22. The inner surfaces of the hollow portions 27a function as the surface of the hydrogen gas flow path. Furthermore, the fuel electrode side collector 27 is provided with an electrode contact surface 27c that contacts the electrode diffusion layer of the fuel electrode 33. Note that the separator 22 has an unshown air electrode side collector serving a collector, on the other side. The air electrode side collector is a member for conducting electric current outward by contacting the electrode diffusion layer of the air electrode 32 in the adjacent unit cell 35, which is not shown, and has the same structure as that of the fuel electrode side collector 27; however detailed description thereof is omitted here.

In addition, to the inner surfaces of one or more of the hollow portions 27a located at the lower portion of the separator 22, more preferably at the portion corresponding to the water-accumulating portion 26, water-repellent treatment is applied to form water-repellent surfaces 27b. The water-repellent treatment is a treatment in which, for example, a water-repellent substance such as polytetrafluoroethylene (PTFE) is partially applied using masking, or the like. Note that the water-repellent treatment can be applied to other surfaces of the separator 22 including the fuel electrode side collector 27, except to the electrode contact surface 27c so as not to increase contact resistance. Note also that, although three of the hollow portions 27a are formed with the water-repellent surfaces 27b in the example shown in FIG. 1B, the number of the hollow portions 27a formed with the water-repellent surfaces 27b can be arbitrarily set.

Because affinity between the separator 22 and water is reduced by forming the water-repellent surfaces 27b, water droplets 34 as the water that has flowed in the hollow portions 27a can smoothly move in the hollow portions 27a. Therefore, even when the amount of the water in the hydrogen gas flow path has been increased by the increase of the amount of the back-diffusing water, the excess water is smoothly discharged from the hydrogen gas flow path through the hollow portions 27a in which the water-repellent surfaces 27b are formed.

As described above, in the present embodiment, the fuel cell stack 11 has the water-repellent surfaces 27b, which have water repellency, at the lower portion of the separator 22 on the fuel electrode 33 side. Therefore, because the water accumulated in the fuel gas flow path is smoothly discharged from the hydrogen gas flow path through the hollow portions 27a in which the water-repellent surfaces 27b are formed, the fuel electrode 33 is not covered by the water either locally or entirely. Hereby, because the reduction in the area required for the electrochemical reaction, which is generated by contact of the hydrogen gas with the fuel electrode 33, is prevented, reduction in performance of the fuel cell and deterioration of the fuel electrode 33 can be prevented. In addition, because the flow of the hydrogen gas becomes smooth and thus the hydrogen gas is not retained in the hydrogen gas flow path, there is no occurrence of the potential shift which is caused by mixture of the remaining hydrogen gas and the air at start or stop of the fuel cell stack 11, and therefore the fuel electrode 33 does not deteriorate.

Note that the present invention is not limited to the embodiment described above, and various modifications based on the purpose of the present invention are possible without being excluded from the scope of the present invention. For example, the present invention can be applied to a separator that is formed so that a fuel gas flows downward with respect to the direction perpendicular to the direction of gravity, or to a separator that is formed at an angle upward to the extent with which water can be discharged by the fuel gas flow against gravitational force.

INDUSTRIAL APPLICABILITY

The present invention can be applied to a fuel cell device.

The invention claimed is:

1. A fuel cell device provided with a fuel cell having an electrolyte layer interposed between a fuel electrode and an oxygen electrode, the fuel cell comprising:
   a laminated cell module including a separator, the separator including a fuel electrode side collector having a porous metal body, with one side of the fuel electrode side collector having parallel, spaced grooves, defining fuel gas flow paths along the fuel electrode, substantially perpendicular to the direction of gravity
   wherein the one side of the fuel electrode side collector has a lower portion and an upper portion contiguous with the lower portion;
   wherein, in the lower portion of the one side of the fuel electrode side collector, at least surfaces of the grooves are covered with a water-repellent substance; and
   wherein there is no coating of the water-repellent substance on the upper portion of the one side of the fuel electrode side collector.

2. The fuel cell device according to claim 1, wherein
The lower portion of the one side of the fuel electrode side collector corresponds to a water-accumulating portion in which water accumulates in the fuel gas flow path.

* * * * *